R. C. OLSON.
CRANK HANDLE.
APPLICATION FILED FEB. 24, 1920.
1,383,994.  Patented July 5, 1921.
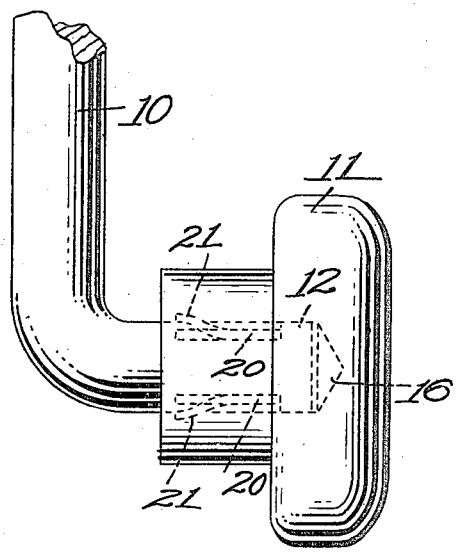
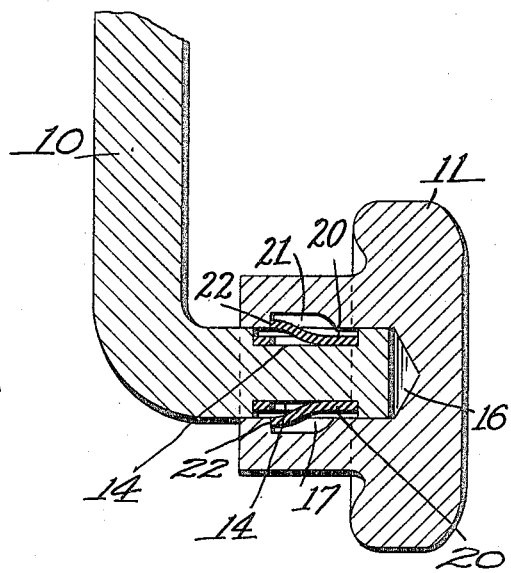
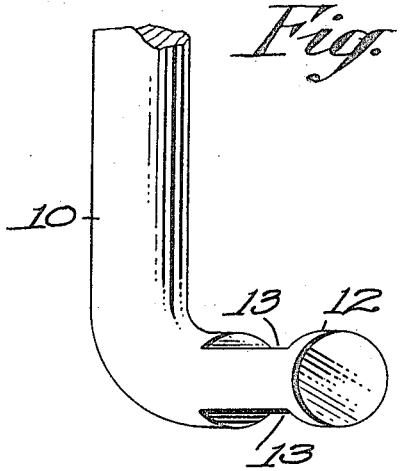
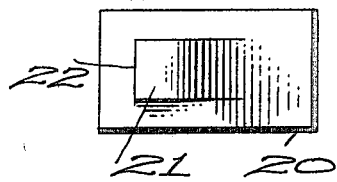
Inventor.
Robert C. Olson.
By Attorneys.
Southgate & Southgate.

UNITED STATES PATENT OFFICE.

ROBERT C. OLSON, OF WORCESTER, MASSACHUSETTS.

CRANK-HANDLE.

1,383,994.  Specification of Letters Patent.  Patented July 5, 1921.

Application filed February 24, 1920. Serial No. 360,698.

*To all whom it may concern:*

Be it known that I, ROBERT C. OLSON, a citizen of the United States, residing at Worcester, in the county of Worcester and State of Massachusetts, have invented a new and useful Crank-Handle, of which the following is a specification.

The principal object of this invention is to provide a connection between a metallic crank and a handle grip of such a nature that the two parts can be assembled in a minimum of time, and when assembled, will be permanently connected together but the handle grip will be readily rotatable on the end of the crank handle; also to provide improvements in the details of construction by which this result is secured of a simple and inexpensive character.

Reference is to be had to the accompanying drawings, in which—

Figure 1 is an elevation of a crank handle constructed in accordance with this invention;

Fig. 2 is an axial sectional view of the same;

Fig. 3 is a perspective view of the end of the crank, and

Fig. 4 is a plan of one of the locking pieces.

The invention is shown as applied to a metallic crank 10 to which is applied a handle grip 11, which is designed to be rotatably mounted on the handle end 12. This handle end is a cylindrical member extending at right angles from the main body of the crank and in its preferred form, comprises two slots 13 preferably located opposite to each other and extending transversely. In the form shown these slots are formed by slabbing off the metal or milling it on the opposite sides so as to provide two opposite flat surfaces 14. Thus the slots are made segmental in shape.

The handle grip 11 is provided with a central or axial passage 16 of a size to admit the handle end 12, and it is also provided with a circumferential groove 17 located in a position about midway between the ends of the slots 13 when the parts are assembled.

Another element of the device consists in the locking member 20, formed of tempered steel and having a tongue 21 formed integrally therewith and projecting outwardly therefrom. This tongue on account of the material of which the plate is made, is resilient.

In the assembling of the device, one of these plates 20 is placed in each of the slots 13 with the flat end 22 of the projecting tongue extending toward the main part of the crank 10. Then the handle grip 11 is forced on, the tongue 21 yielding to allow this motion to take place. But as soon as the handle grip is all the way on, these tongues spring outwardly as shown in Fig. 2 into the groove 17 and prevent the separation of the parts. However, as this groove is circumferential, they do not prevent rotation of the handle grip, but permit that to take place freely. It will be noted that the handle grip does not have to be placed in any particular position circumferentially in order to assemble the parts.

It will be seen therefore, that this, whether one or more of the slots 13 are used, constitutes a very convenient way of connecting these two parts together in a rotatable manner and providing a permanent connection. The cost is extremely low as will be appreciated for machining, material and assemblage, and the construction is strong and durable.

Although I have illustrated and described only a single form of the invention, I am aware of the fact that modifications can be made therein by any person skilled in the art without departing from the scope of the invention as expressed in the claims.

Therefore I do not wish to be limited to all the details of construction herein shown and described, but what I do claim is:—

1. The combination with a crank having a handle end having a transverse slot in its wall, of a handle grip having a cylindrical passage for said handle end and provided with a groove in the wall of said passage, and a plate adapted to lie in said slot, and a yielding tongue projecting therefrom into said groove and extending toward the body of the crank.

2. The combination with a crank having a handle end slabbed off on one side so as to leave a flat segmental shaped depression, at a distance from the end, of a handle grip rotatably mounted thereon and having a cylindrical passage for said handle end and provided with a circumferential groove in the wall of said passage, and means for securing the handle grip to the handle end, comprising a piece of tempered metal having a flat portion adapted to lie in the depression in the handle end, and a yielding tongue projecting therefrom into said groove.

3. The combination with a crank having a handle end slabbed off at one side at a distance from its end, of a handle grip having a cylindrical passage for said handle end and provided with a circumferential groove in the wall of said passage, and means for securing the handle grip to the handle end, comprising a piece of tempered metal having a portion adapted to lie in the depression in the handle end, and a yielding tongue projecting therefrom into said groove.

4. The combination with a crank having a cylindrical handle end provided with two transverse slots, of a rotatable handle grip therefor having an axial cylindrical passage extending in from one end adapted to receive said handle end and provided with a circumferential groove in the wall of said passage, and a pair of plates each located in one of said slots, and each having a resilient tongue projecting outwardly therefrom beyond the circumferential of the handle end and into said groove, whereby the handle grip may be readily applied to the handle end in permanent position.

5. The combination with a crank having a cylindrical handle end provided with two opposite segmental transverse slots having their bases opposite and parallel with each other, of a rotatable handle grip therefor having an axial cylindrical passage extending in from one end adapted to receive said handle end and provided with a circumferential groove in the wall of said passage, and a pair of steel plates each located on the flat base of one of said segmental slots, and each having a resilient tongue projecting outwardly therefrom beyond the circumference of the handle end and into said groove whereby the handle grip may be readily applied to the handle end and, when applied, will be permanently fixed thereto as far as longitudinal displacement is concerned, but will be readily rotatable thereon.

6. The combination with a crank having a handle end having a transverse slot in its wall, of a handle grip having a cylindrical passage for said handle end and provided with a groove in the wall of said passage, and a plate adapted to lie in said slot, and a yielding tongue projecting therefrom into said groove and extending toward the body of the crank in such manner as to permanently locate said handle grip in a parallel position with said crank and in a fixed position on the circumference of said crank.

In testimony whereof I have hereunto affixed my signature.

ROBERT C. OLSON.